United States Patent [19]

Oishi et al.

[11] Patent Number: 4,475,155
[45] Date of Patent: Oct. 2, 1984

[54] I/O ADAPTER WITH DIRECT MEMORY ACCESS TO I/O CONTROL INFORMATION

[75] Inventors: Shiro Oishi; Masatsugu Shinozaki, both of Hadano, Japan

[73] Assignee: Hitachi, Ltd., Tokyo, Japan

[21] Appl. No.: 323,025

[22] Filed: Nov. 19, 1981

[30] Foreign Application Priority Data

Nov. 25, 1980 [JP] Japan .............................. 55-166289

[51] Int. Cl.³ .............................................. G06F 3/00
[52] U.S. Cl. ................................................. 364/200
[58] Field of Search .............................. 364/200, 900

[56] References Cited

U.S. PATENT DOCUMENTS

| 4,133,030 | 1/1979 | Huettner et al. ..................... 364/200 |
| 4,325,119 | 4/1982 | Grandmaison et al. ............. 364/200 |
| 4,328,543 | 5/1982 | Brickman et al. ................... 364/200 |
| 4,346,437 | 8/1982 | Blahut et al. ........................ 364/200 |
| 4,346,439 | 8/1982 | Huno et al. .......................... 364/200 |

OTHER PUBLICATIONS

PDP11/45 Processor Handbook, p. 233, Digital Equipment Corporation, 1971.

PDP11 Peripherals and Interfacing Handbook, pp. 281, 286, 287, Digital Equipment Corporation, 1971.

Primary Examiner—Jerry Smith
Assistant Examiner—Mark P. Watson
Attorney, Agent, or Firm—Antonelli, Terry & Wands

[57] ABSTRACT

A data proessing system includes a processor, a memory, a direct memory accessing (DMA) control unit and an input/output adapter. A memory area of a given capacity is reserved in the memory for storing control information transferred between the processor and the adapter. For transfer of the control information, the adapter accesses the control information stored in the memory area through direct memory accessing under control of the DMA control unit while the processor can make access to the control information through a memory read/write command. By storing at the predetermined area of the memory the control information transferred between the processor and the adapter, the quantity of hardware and the number of IC's required for implementing the adapter can be significantly reduced. Conflicting access requests to the main memory area by the processor and adapter are prevented through time-division control of the memory bus.

6 Claims, 3 Drawing Figures

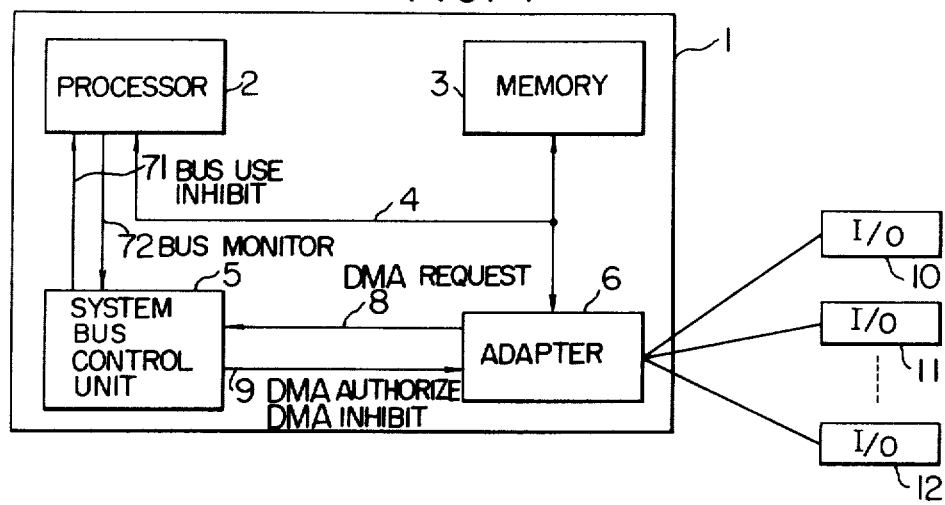
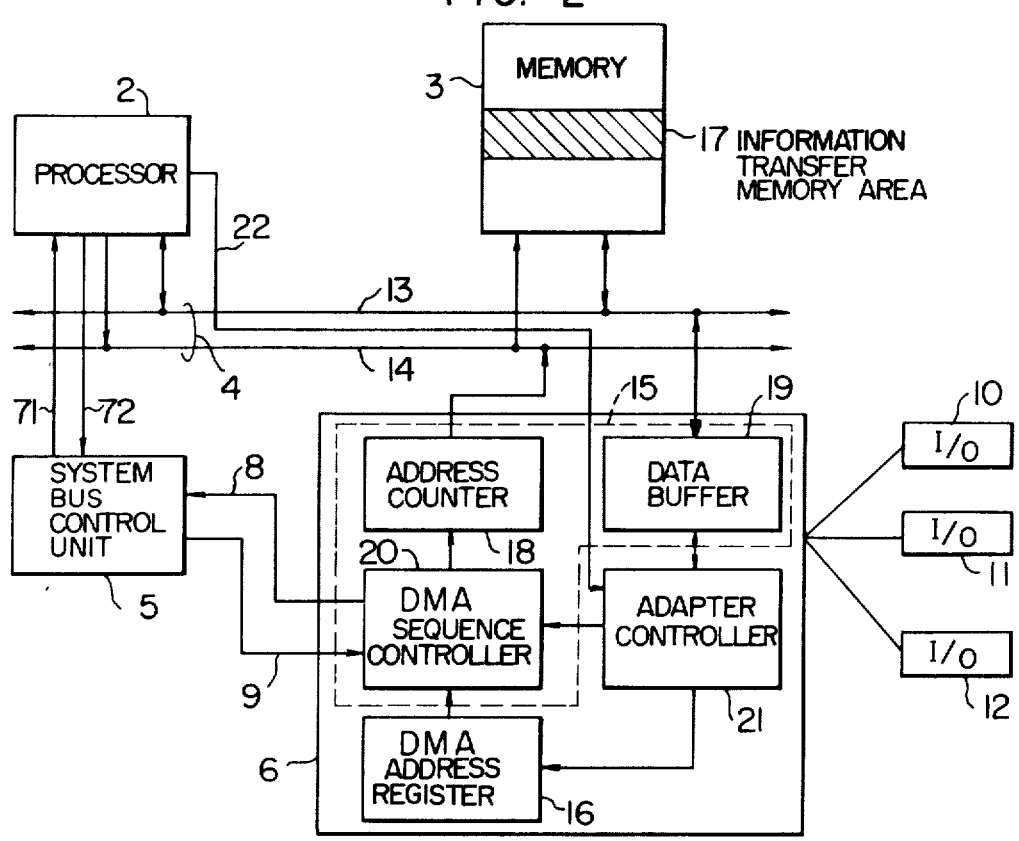

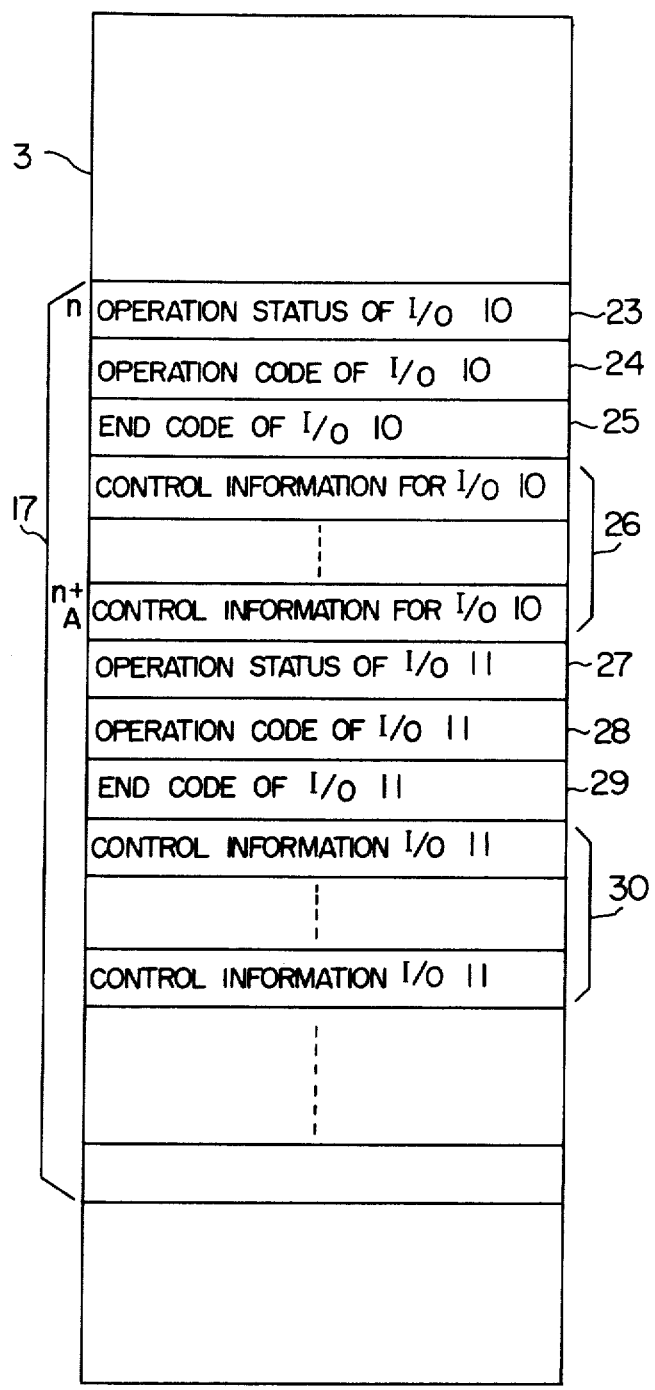

I/O ADAPTER WITH DIRECT MEMORY ACCESS TO I/O CONTROL INFORMATION

The present invention relates generally to a data processing system. In more particularly, the invention concerns control of the transfer of control information in a data processing, system which comprises a processor such as a microcomputer, and an input/output adapter for effecting connection to a plurality of input/output devices, and in which the control information is transferred between the processor and the input/output adapter (hereinafter also referred to simply as an adapter).

A data processing system is known which comprises a processor such as a microcomputer for executing data processings, a memory and an adapter for effecting connection to a plurality of input/output devices. In the data processing computer system of this type, an interface between the processor and the adapter is realized by providing a group of registers for information transfer in the adapter, wherein the control information as required such as status information relating to an interruption issued from the adapter to the processor, for example, is stored in a group of information with input-/output (I/O) commands for read/write operations. The data processing system of this type however suffers from drawbacks as described below.

In the first place, in the case where a large quantity of interface information is to be transferred between the processor and the adapter, a correspondingly increased number of the information transfer registers have to be installed at the adapter, involving an increased number of parts or IC's in the implementation of the adapter.

Second, it should be noted that the number of I/O ports available at the processor is limited. Accordingly, even when the adapter incorporates therein a large number of the information transfer registers, there may arise such a situation that all of the registers can not be accessed by the processor with the I/O instructions or commands. For example, there is known a microprocessor which allows I/O ports to be addressed with eight bits, respectively. Accordingly, in the data processing system using this type microprocessor, the number of available I/O commands amounts to only 256 ($=2^8$) at maximum. Consequently, even when a greater number of the registers are provided, it will be impossible to access all the registers.

Third, when both the adapter and the processor simultaneously make access to one and the same control information register, there may occur a transmission of uncertain or unreliable information, eventually leading to erroneous operations of the data processing system.

It is therefore an object of the present invention to provide a data processing system which permits an increased amount of control information to be transferred between the processor and input/output adapter with a decreased number of parts required for implementing the adapter and without being subjected to restrictions ascribable to the number of existing input-/output ports of the processor.

Another object of the present invention is to provide a data processing system in which each of the adapter and the processor can make access to the control information without paying consideration to the operating state of the other and in which collision of data, transmission of uncertain information and erroneous operation can be positively prevented.

In view of the above and other objects which will become more apparent as this description proceeds, there is provided according to an aspect of the invention a data processing system which comprises a processor, a memory and an input/output adapter, wherein a memory area of a given capacity is reserved in the memory for storing control information transferred between the processor and the adapter. The input/output adapter is provided with an address register for designating the address in the memory and a direct memory access controller for controlling the access to the memory, wherein the area in the memory designated by the address register is accessed directly (direct memory accessing) by the adapter under control of the direct memory access controller while the processor makes access to the memory area with a memory read/write command, to thereby accomplish a transfer or exchange of the control information between the adapter and the processor.

When compared with the hitherto known system in which the control information is stored in a group of registers provided in the adapter, the data processing system according to the invention provides an advantage over the hitherto known system in that the number of parts for implementing the adapter can be remarkably decreased. Further, the processor can read or write the control information from or in the reserved area of the memory with memory read/write commands or instructions without resorting to the use of the I/O commands or instructions. Thus, the processor is insusceptible to restriction imposed by the number of the I/O instructions. By virtue of such an arrangement that the adapter can access the memory through the direct memory accessing or DMA while the processor can make access to the memory with the read/write command or instruction, the possibility of collision of data on the bus as well as transfer of uncertain data or information can be positively prevented.

The present invention and its various features will be apparent from the following detailed description taken in conjunction with the accompanying drawings, in which:

FIG. 1 schematically shows in a block diagram a general arrangement of a data processing system according to an exemplary embodiment of the invention;

FIG. 2 is a block diagram illustrating in more detail the data processing system shown in FIG. 1; and FIG. 3 illustrates an arrangement of a memory used in the data processing system.

The invention will be described in detail by referring to the accompanying drawings which show an exemplary embodiment of the invention. Referring to FIG. 1, a data processing system denoted generally by a reference numeral 1 comprises as main components a processor 2 which may be constituted by a known microcomputer or the like, a memory 3 which may be a random access memory or RAM, an adapter 6 for connection to a plurality of input/output devices 10, 11 and 12 (hereinafter referred to simply as I/O devices), and a direct memory access (DMA) controlling unit 5 which will be also referred to as the system DMA controlling unit. The processor 2, the memory 3 and the adapter 6 are connected to one another through a system bus 4 composed of an address bus and a data bus. The memory 5 is adapted to store therein various data to be processed or having been processed by the processor 2. Further, there is reserved in the memory 3 a predetermined storage area of a given storage capacity for storing therein control information which is transferred between the processor 2 and the adapter 6. The memory 3 can be accessed by the adapter 6 on a direct memory accessing (DMA) basis, while the processor 2 is capable of accessing the memory 5 by issuing memory read/write commands, whereby the control information as well as data is read out of or written in the memory 3 to or from the processor 2 and/or the adapter 6. The system DMA controlling unit 5 supervises or monitors the occupied or unoccupied state (i.e. busy or idle state) of the system bus 4. More particularly, when the memory 3 is accessed by both the processor 2 and the adapter 6, the system DMA controlling unit 5 processes the access requests from the processor 2 and the adapter 6 on a time division basis so that these accesses do not collide with each other on the bus 4. To this end, the DMA controlling unit 5 receives a bus supervising signal 72 from the processor 2. By way of example, this supervising signal 72 may be logic "1" when the bus 4 is used or occupied by the processor 2, while the signal 72 may be logic "0" when the bus 4 is idle. Under the circumstance, when a direct memory access request signal 8 is supplied from a direct memory access (DMA) sequence controller 20 (described hereinafter with reference to FIG. 2) of the adapter 6, the system DMA controlling unit 5 will check the bus supervising signal 72. At that time, unless the bus 4 is occupied by the processor 2, the DMA request signal 8 is accepted, resulting in a direct memory access or DMA authorizing signal 9 of logic "1" being sent back to the adapter 6 to allow it to use the bus 4. At the same time that the DMA authorizing signal 9 is issued, a bus use inhibiting signal 71 is transmitted to the processor 2 to inhibit the processor 2 from using the bus 4, whereby issue of the memory read/write command by the processor 2 is suppressed.

On the other hand, when the check of the bus supervising signal 72 indicates that the bus 4 is occupied by the processor 2, a DMA inhibiting signal which corresponds to the DMA authorizing signal 9 of logic "0" is sent to the adapter 6, whereby the adapter 6 is requested to wait until the bus 4 is released from the occupation by the processor 2. In this manner, even when the memory read/write command is issued to an address of the memory 3 by the processor 2 simultaneously with issue of the DMA request to the same memory address by the adapter 6, there will arise no possibility that transmission of uncertain data ascribable to collision between the command and the request should take place. The input/output devices 10, 11 and 12 are constituted, for example, by printers, displays or the like, and are controlled by the adapter 6 under command of the processor 2 to perform relevant data inputting and/or outputting functions.

Referring to FIG. 2 which shows in more detail the system shown in FIG. 1, it can be seen that the system bus 4 is constituted by the data bus 13 and the address bus 14 to which the memory 3 and the adapter 6 are connected.

In particular, an arrangement of the adapter 6 is illustrated in detail in FIG. 2. As can be seen from this figure, the adapter 6 comprises a direct memory access or DMA controller 15 for its own sake (hereinafter referred to as adapter DMA controller to distinguish from the DMA controlling unit 5 for the whole data processing system shown in FIG. 1), an address register 16 and an adapter controller 21. The adapter DMA controller 15 in turn is composed of a data buffer 19, a DMA sequence controller 20 and an address counter 18. The data buffer 19 serves to store a leading address of a predetermined or particular area 17 of the memory 3 supplied from the processor 2 by way of the data bus 13 and additionally serves to store temporarily data read out of the memory 3 and transmitted through the data bus 13 in precedence to the outputting of this data to the I/O device 10, 11 or 12. Further, data supplied from the I/O device 10, 11 or 12 and to be stored in the memory 3 is temporarily stored in this data buffer 19. Data transfer from the memory 3 to the I/O device 10, 11 or 12 as well as the data transfer from the I/O device to the memory 3 for storage therein is controlled by the adapter controller 21. Activation of the adapter controller 21 is triggered by a DMA address setting signal 22. The address register 16 is adapted to store the leading address of a predetermined area 17 of the memory 3. In other words, the leading address supplied from the processor 2 and stored in the data buffer 19 is placed in the address register 16. The DMA sequence controller 20 serves to produce the direct memory access or DMA request signal 8 when the memory 3 is to be accessed by the adapter 6 and additionally serves to set the access request for the memory 3 in the waiting state, when no DMA authorizing signal 9 is issued in response to the DMA request signal 8. Further, the DMA sequence controller 20 controls the transfer of the leading address from the register 16 to the address counter 18 upon accessing the predetermined area 17 of the memory 3 as well as the loading of the relevant address into the address counter 18 for reading or writing of data from or to the memory 3. Clocking or incrementing of the address counter 18 is controlled also by the DMA sequence controller 20. Thus, the content of the address counter 18 indicates the relevant address of the memory 3, which address is transmitted to the memory 3 through the address bus 14.

The memory 3 stores therein data processed by the processor 2 for transmission to the I/O device 10, 11 and/or 12 as well as data inputted from the I/O device for processing by the processor 2. In this connection, it should be noted that this data to be processed or having been processed is not stored at the predetermined area 17, which is reserved for the storage of the control information characteristic of the invention.

FIG. 3 illustrates an exemplary arrangement of the predetermined or particular area 17 of the memory 3. At a leading address (e.g. address n) of this particular area 17, there is stored operation status information 23 of the I/O device 10. At an address (n+1) of this area 17, there are stored operation codes which include, for example, an idle code, a transmission code, a reception code and the like. At an address (n+2), an end code is stored, which may include a normal end code or an abnormal end code. At addresses (n+3) to (n+A), there is stored other control information for the I/O device 10. The storage capacity represented by A depends on the actual data processing system and may be on the order of 32 bytes, for example. The other control information may include a DMA initiating address for transmission, a DMA byte count for transmission, a DMA initiating address for reception, a DMA byte count for reception, status information of the adapter, a transmission/reception error status information and others.

At addresses (n+A) +1 et seg. of the area 17, there is stored the similar control information 27, 28, 29 and 30 for the I/O device 11 in the same format as described above in conjunction with the control information for the I/O device 10. Similar control information for the I/O device 12 is also stored in a similar manner.

Now, description will be made as the control operation for exchange or transfer of the control information according to the invention by referring to FIGS. 2 and 3. When the data processing system 1 is initialized in response to the closing of a main switch (not shown), a DMA address setting signal 22 is set to a logic "1" or "true" level by the processor 2, whereby the leading address n of the particular area 17 reserved for the control information in the memory 3 is fed to the data bus 13. The adapter 6 initiates operation in response to the DMA address setting signal 22 of logic "1" or "true" to fetch the leading address n of the memory area 17 into the data buffer 19 from the data bus 13. Subsequently, the leading address n is placed in the DMA address storage register 16 by way of the adapter controller 21. The leading address is utilized for controlling the associated data I/O devices 10, 11 and 12 by making use of the control information stored in the particular area 17 of the memory 3.

By way of example, it is assumed that data is to be outputted to the I/O device 10. Then, an output command code is written in the memory area 17 of the memory 3 at the address 24 labelled "OPERATION CODE FOR I/O 10" in response to the memory write command issued by the processor 2, while information required for the output operation is written at the address 26 labelled "CONTROL INFORMATION FOR I/O 10", which information may include a memory address at which output data to be outputted from the memory 3 to the I/O device 10 by way of the adapter 6 through the direct memory access (i.e. DMA) is stored, the amount of data to be outputted and other information. Subsequently, an activation code is written in the area 17 at the address 23 labelled "OPERATION STATUS OF I/O 10". In succession to the storage of the memory address in the DMA address storage register 16, the content of the DMA address counter 18 is incremented starting from the address n, whereby the memory area 17 for the information transfer is scanned repeatedly. When the activation code written at the address 23 labelled "OPERATION STATUS OF I/O 10" of the memory area 17 by the processor 2 is read out, data transfer to the I/O device 10 is initiated on the basis of the information stored at the address 24 labelled "OPERATION CODE OF I/O 10" and at the address 26 labelled "CONTROL INFORMATION FOR I/O 10". The manner in which such data transfer is carried out is well known in the art and any further description will be unnecessary. Simultaneously with the data transfer mentioned above, a code indicative of the operation being executed is written in the memory area 17 at the address 23 labelled "OPERATION STATUS OF I/O 10 through the direct memory accessing or DMA and the processor 2 is informed of that the operation command has been transmitted to the I/O device 10.

In completing the data transfer operation to the I/O device 10, the adapter 6 writes a code indicative of the normal end or abnormal end at the address 25 labelled "END CODE OF I/O 10" of the memory area 17. In the case of the abnormal end or completion, relevent error information is written in the memory area 17 at the assigned one of the addresses 26 labelled "CONTROL INFORMATION FOR I/O 10" through the direct memory access or DMA, which is followed by the writing of the operation end code at the address 23 labelled "OPERATION STATUS OF I/O 10", whereby the processor 2 is informed of completed data transfer operation of the adapter 6 to the I/O device 10.

When it is not required to command operations of the I/O device 10, the processor 2 issues a write command to cause the idle code to be written in the information transfer area 17 of the memory 3 at the address 23. During scanning of the memory area 17 through the direct memory access or DMA, the adapter 6 reads out the idle code and confirms that the processor 2 has received the operation end code from the adapter 6 and that any further operation command is not issued to the I/O 10. Here, it should be recalled that although the data transfer through the direct memory access or DMA between the adapter 6 and the memory 3 is effected without considering the presence of the memory read/write command issued by the processor and vice versa, there arises no erroneous operations of the processor 2 and the adapter 6, because transmission of uncertain or indefinite data or information is suppressed by the DMA controlling unit 5, as described hereinbefore.

As will be appreciated from the foregoing description, by virtue of such arrangement according to the invention in which the registers for information or data transfer, which have heretofore been provided in the adaptor 6, are replaced by a particular memory area 17 reserved in the memory 3 for the data transfer, a much increased quantity of information can be transferred between the processor 2 and the adaptor 6 without being subjected to restrictions ascribable to the number of IC's and I/O ports of the processor 2.

The invention is never restricted to the exemplary embodiments disclosed herein, but modifications and variations will readily occur to those skilled in the art without departing from the spirit and scope of the invention. For example, although it has been assumed in the foregoing that the leading address of the particular area 17 of the memory is transferred from the processor 2 to the adapter 6, it is also possible to place the leading address in the address register in a fixed or programmable manner.

What is claimed is:

1. A transfer control apparatus for controlling the transfer of device control information to and from a plurality of input/output devices, comprising:
a memory having a specified storage area for storing device control information for controlling said input/output devices and a further storage area other than said specified storage area for storing data;
at least one input/output adapter connected to said plurality of input/output devices including direct memory access means for directly accessing said memory and control means for controlling said input/output devices on the basis of said device control information stored in said specified storage area of said memory;
a processor capable of accessing said memory in response to a read/write instruction to read or write said device control information from or into said specified storage area of said memory, including means for applying to said input/output adapter a leading address in said specified storage area of said memory;
a common bus interconnecting said processor, said input/output adapter and said memory; and
bus control means for permitting only one of said input/output adapter and said processor to use said common bus at a given time for access to said memory;

said direct memory access means of said input/output adapter including buffer means for temporarily storing said leading address received from said processor and sequence controller means for sequentially scanning said specified storage area of said memory beginning with said leading address stored in said buffer means when the use of said common bus by said input/output adapter is permitted by said bus control means.

2. Apparatus according to claim 1, wherein said direct memory access means in said input/output adapter includes an address counter indicating an address in said memory, said address counter being connected to said sequence controller means so that the count value thereof is sequentially updated, and including means for transferring said leading address from said buffer means to said address counter.

3. Apparatus according to claim 1, further comprising means including a signal line for transmitting a control signal for transferring a leading address from said processor to said input/output adapter via said common bus.

4. A transfer control method for controlling the transfer of device control information in terminal apparatus including an adapter connected to a plurality of input/output devices, a processor for processing data, a memory having a plural storage locations for storing at least data processed by said processor and device control information, and a common bus connecting said adapter, said processor and said memory, the method comprising the steps of:

writing device control information into a specified storage area of said memory by means of the processor in accordance with an instruction for reading or writing data;

permitting only one of said input/output adapter and said processor to use the common bus at a given time for access to said memory in accordance with a bus request from the adapter or the processor;

transferring the leading address in the specified area of said memory to said adapter from the processor;

sequentially generating addresses in said adapter for addressing successive storage locations in the specified area of said memory beginning with said leading address;

reading control information directly from the specified area of the memory as the adapter sequentially generates said addresses when the use of the common bus is permitted for the input/output adapter; and transferring a series of device control information to a certain input/output device when the adapter acknowledges predetermined status information in the device control information read from the specified area of said memory.

5. A method according to claim 4, further comprising the step of writing a predetermined control signal into said specified area by said adapter when the step of outputting a series of control information to a certain device is terminated.

6. A method according to claim 4, further comprising the step of transmitting a predetermined control signal from the processor to the adapter when the processor transfers the leading address to the adapter.

* * * * *